(12) United States Patent
Iwamura

(10) Patent No.: US 6,400,122 B1
(45) Date of Patent: Jun. 4, 2002

(54) BATTERY HOLDING DEVICE

(75) Inventor: Akira Iwamura, Kawanishi (JP)

(73) Assignee: Matsushita Electric Industrial Co., Inc., Osaka (JP)

( * ) Notice: Subject to any disclaimer, the term of this patent is extended or adjusted under 35 U.S.C. 154(b) by 0 days.

(21) Appl. No.: 09/680,824

(22) Filed: Oct. 6, 2000

(30) Foreign Application Priority Data

Oct. 6, 1999 (JP) ............................................ 11-285559

(51) Int. Cl.⁷ .............................. H02J 7/00; H01M 2/10
(52) U.S. Cl. ........................................ 320/107; 429/99
(58) Field of Search ........................... 320/107; 429/99, 429/100

(56) References Cited

FOREIGN PATENT DOCUMENTS

| | | |
|---|---|---|
| EP | 0 905 803 | 3/1999 |
| JP | 02106869 | 4/1990 |
| JP | 10-270006 A | 10/1998 |

*Primary Examiner*—Gregory Toatley
(74) *Attorney, Agent, or Firm*—Ratner & Prestia

(57) ABSTRACT

The battery holding device is structurally simplified. It is not necessary to use many parts to form the casing, and the parts used have simple shapes. Accordingly, it is very easy to finish the parts. Also, the parts can be easily assembled. The battery holding device embodying the present invention includes a pair of plate type supports having a first plate type support and a second plate type support, and a projection disposed on at least one of the first and second plate type supports. The first support and the second support are opposed to each other. The projection extends toward the opposed support. The first support and the second support are connected to each other via the projection. A pair of the plate type supports and the projection form a casing. The space is formed by an inner surface of the casing, the casing has a space formed inside the casing, and the casing catches and holds a plurality of batteries arranged in rows in the space.

27 Claims, 7 Drawing Sheets

BATTERY HOLDING DEVICE

FIELD OF THE INVENTION

The present invention relates to a construction of a battery holding device which stores and holds a plurality of batteries.

BACKGROUND OF THE INVENTION

Generally, in order to ensure highly efficient charging and discharging cycles of batteries in a state of being loaded in apparatus, it is preferable to maintain the battery temperature within a specified range. This will assure the battery performance and life expectancy. To meet the purpose, the batteries held in a battery holding device are appropriately spaced apart. This arrangement improves the interior ventilation for the batteries. Accordingly, it becomes possible to control the battery temperature.

A conventional battery holding device of this type is mentioned in Japanese Open-Laid Patent No. 10-270006. FIG. 7 is an exploded perspective diagram of a conventional battery holding device.

In FIG. 7, there is an arrangement of twenty one battery modules 88 each of which contains six series-connected batteries. A case body 81 is a rectangular box shaped with an open top and bottom. The case body 81 is molded in one-piece of plastic material. Right/left end wall 86, partition wall 87 and cooling fin plate 84 of the case body 81 respectively have insertion holes 89, 90, 91 for the insertion of the battery module 88. As for each group of these holes, there are 21 holes in total, 3 rows of the hole in a horizontal direction and 7 rows of the hole in a vertical direction, which are respectively made in the corresponding positions. The holes 89, 90, 91 are made at equal pitches horizontally and vertically, and are larger in diameter than the outer dimension of the battery module 88. A rubber sheet 85 is secured to the partition wall 87 and serves to prevent vibration of the battery module 88. To one end of case body 81 is secured a first end plate 82. To the other end is secured a second end plate 83. The end plates 82 and 83 are made up of plastic plate in which pass-bar 92 is insert-molded and secured. When bolt 93 is tightened, the pass bar 92 is electrically and mechanically connected to a square nut located at the positive electrode end or a hexagonal nut located at the negative electrode end of the battery module 88. In this way, twenty one battery modules 88 arranged parallel with one another in a battery holding device are electrically series-connected by the pass-bar 92 of the first end plate 82 and a pass-bar (not shown) of the second end plate 83.

In the case of such conventional construction, it is necessary to use many parts such as end plate 82, 83, cooling fin plate 84, and rubber sheet 85 as well as case body 81. In addition, the end plate 82, 83 includes inserted pass bars, making the interior structurally complicated. Accordingly, a conventional battery holding device requires complicated procedures for assembling and finishing of parts. Also, it is very difficult to assemble the parts.

SUMMARY OF THE INVENTION

The present invention is to provide a low-cost, easy-to-assemble battery holding device which is simplified in structure and capable of maintaining the cooling and heating performance for batteries. A battery holding device embodying the present invention comprises a pair of plate type supports having a first plate type support and a second plate type support, and a projection disposed on at least one of the first and second plate type supports. The first support and the second support are opposed to each other. The projection extends toward the opposed support. The first support and the second support are connected to each other via the projection. A pair of the plate type supports and the projection form a casing.

Preferably, said space is formed by an inner surface of said casing, said casing has a space formed inside the casing, and said casing catches and holds a plurality of batteries arranged in rows in said space.

By this construction, the battery holding device is structurally simplified. It is not necessary to use many parts to form the casing, and the parts used have simple shapes. Accordingly, it is very easy to finish the parts. Also, the parts can be easily assembled. Further, the casing is able to provide ventilation for the batteries, and the battery holding device comprising this casing is able to ensure excellent cooling and heating performance.

REFERENCE NUMERALS

Figure 1:
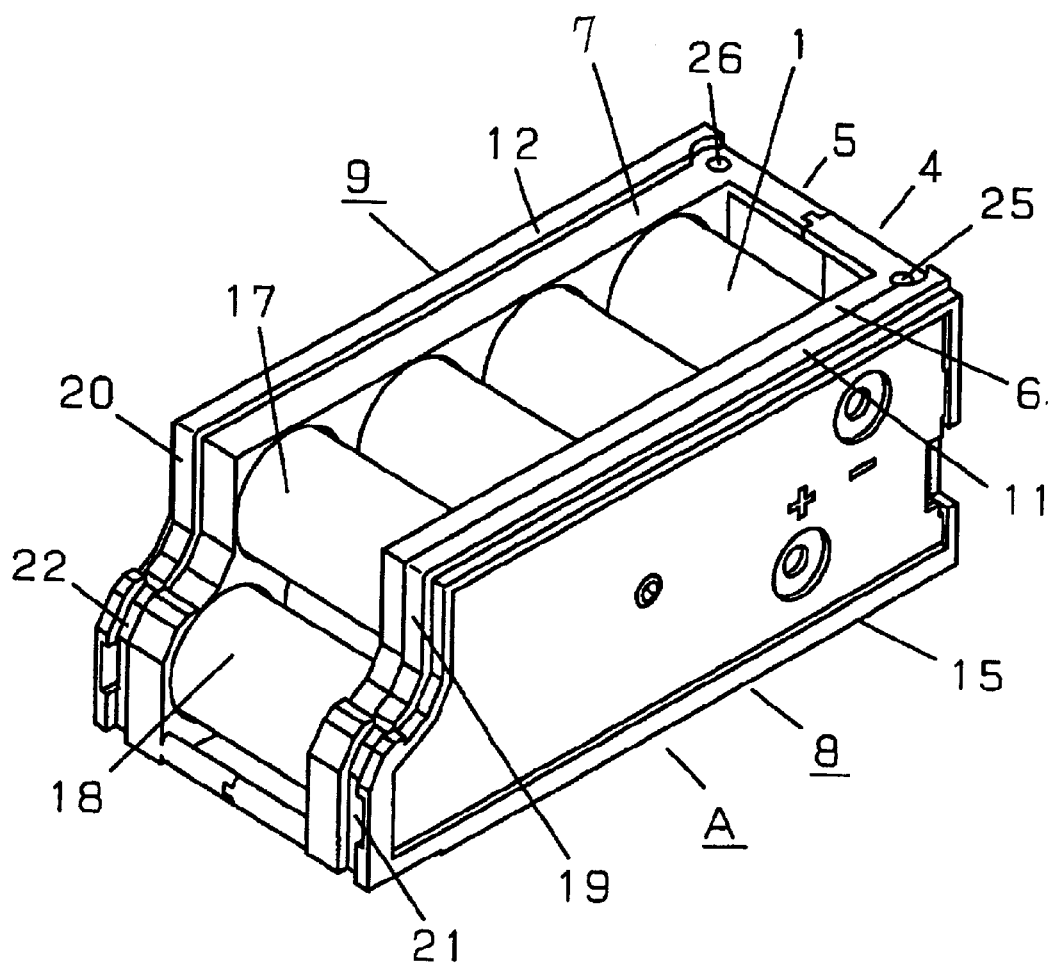
FIG. 1 is a perspective diagram of the module appearance of a battery holding device embodying the present invention.

1 Battery
2. 3 Support
2A, 3A One end of support
2A, 3B Other end of support
4, 5 Projection
4A Projection-end bulge
5A Projection-end recess
6. 7 First side
8, 9 Casing
10, 23, 24 Space
11, 12 First side convex
13, 14 Second side
15, 16 Second side recess
17 First row of battery
18 Second row of battery
19A, 20A Stepped end recess
21A, 22A Stepped end convex
19, 20 Small convex
21, 22 Small recess
25, 26 Bolt hole
27 Through bolt
28 Fixing plate
101, 102, 103 Module
81 Case body
82 First end plate 83 Second end plate
Cooling fin plate
Rubber sheet
Right/left end wall
Partition wall
Battery module
90, 91 Insertion hole
Pass bar
Bolt

DETAILED DESCRIPTION OF THE INVENTION

A battery holding device in accordance with an embodiment of the present invention comprises a pair of plate type supports having a first plate type support and a second plate type support, and a projection disposed on at least one of the first support and the second support, wherein the first support and the second support are opposed to each other, the projection extends in a direction of opposed support, the first support and the second support are connected to each other via the projection, the pair of plate supports and the projection form a casing, the space is formed by an inner surface of the casing, the casing has a space formed inside the casing, and the casing catches and holds a plurality of batteries arranged in rows in said space. By virtue of this construction, the casing to hold batteries is simplified. The number of component parts used is decreased and the man-hour reduction may be realized. Further, the cost required is very low.

Preferably, the projection has a first projection and a second projection, the first support has a first end and the first projection extending to the second support, the second support has a second end and said second projection extending to said first support, the first projection and the second projection are connected to each other, and the first support, the second support, the first projection and the second projection form the casing.

Preferably, the projection has a form of plate.

Preferably, the casing has the space so that the plurality of batteries may be arranged in a plurality of rows, and may be shifted by a half pitch every row, and when said plurality of battery are set in the casing, a wind tunnel for ventilation is formed between the each battery.

Preferably, the first side of the casing has a convex and the second side has a recess. Accordingly, the casings may be reliably connected to each other. Especially, stacking the casings, placing one on another, may complete their positioning, making the assembling job easier.

Preferably, there are provided a plurality of the casings, and the convex at the side of each casing is engaged with the recess at the side of adjacent casing when the casings are stacked. The casings thus engaged with one another internally create spaces that form wind tunnels as ventilating passages. Accordingly, the spaces may serve as passages for cooling and heating of the batteries. Further, it is possible to obtain a low-cost, easy-to-assemble device.

Preferably, the casing has said space so that the plurality of batteries may be arranged in a plurality of rows, and may be shifted by a half pitch every row, and when the plurality of battery are set in the casing, a wind tunnel for ventilation is formed between the each battery.

Preferably, the casing has bolt holes that go through from the first side to the second side. Accordingly, it is easy to sequentially connect adjacent casings to one another by bolts inserted into the through holes, thereby setting up a plurality of casings in one body construction.

Thus, the number of parts used is reduced, the interior structure is simple and it is very easy to assemble the parts.

Preferably, the first support includes the first projection and a first stepped portion formed at the another end of the first support, the second support includes the second projection and a second stepped portion formed at the another end of the second support, the casing includes a first casing and a second casing, each casing of the first casing and the second casing has the projections and the stepped portions, the stepped portions are connected to each other, and thereby a space surrounded by the first casing and the second casing is formed.

Preferably, the casing has the space so that the plurality of batteries may be arranged in a plurality of rows, and may be shifted by a half pitch every row, and when the plurality of batteries are set in the casing, a wind tunnel for ventilation is formed between the each battery.

Preferably, each stepped portion of the first stepped portion and the second stepped portion has a step shape of even steps, the plurality of batteries may be arranged in a plurality of even rows, and may be shifted by a half pitch every row, a difference in the step shape has a distance according to the half pitch every row, and when the first casing and the second casing are connected each other, and when the plurality of batteries are set in the space, a distance between the battery placed at the stepped portion of the first casing and the battery placed at the stepped portion of the second casing has same distance as the pitch of batteries setting in the first casing and the second casing.

Preferably, the each stepped portion has the step shape of two steps, the plurality of batteries may be arranged in two rows.

Preferably, the first casing and said second casing have the same shape each other, and the first casing and the second casing are connected at the stepped portions in a state of reversed shape in positions.

Preferably, the casing includes a plurality of casings, each casing of the plurality of casings has a first side, a second side, a first end and a second end, the first side has a convex, the second side has a recess, the first end has said protrusion, the second end has a stepped portion, the plurality of casings are respectively stacked one upon another so that the each convex and the each recess of the each casing is respectively engaged with adjacent, the plurality of casings are respectively connected one another on its side so that the stepped portions of the each casing is respectively engaged with adjacent, a space formed internally of each casing, and a space surrounded by the plurality of casings is formed, and the space has a ventilating passage in the form of a wind tunnel that is formed by providing a communication through the spaces.

Preferably, said casing has said space so that the plurality of batteries may be arranged in a plurality of rows, and may be shifted by a half pitch every row, the plurality of casings are connected, and when the plurality of battery are set in the casing, a wind tunnel for ventilation is formed between the each battery.

Preferably, the battery holding device further comprising a volt and a fixing plate, wherein the fixing plate disposed at the upper of the casings, the each casing includes holes for casing connection and bolts for casing connection, the hole goes through from the first side to the second side, the bolt is inserted into the hole, and the plurality of casings and the fixing plate are respectively secured in one body by the bolts.

Preferably, the battery holding device in accordance with other embodiment of the present invention uses the pair of plate type supports to catch and hold the plurality of batteries in rows. Each end of the support of the pair of supports has a rib-form projection extending inwardly of each other so that the side is L-shaped. Further, the pair of supports are set up so that the side is C-shaped (U-shaped), thereby forming a casing. Two casings thus formed are alternately reversed and combined with each other. These casings form a space in which batteries are placed. In this way, a ventilating passage necessary for cooling and heating of the batteries may be obtained. Further, these casings are assembled in a sidewise direction and stacked one upon another. These casings are stacked with the recess provided at a part of the first side of each casing engaged with the convex provided at a part of the second side. Thus, the battery holding device is less in the number of parts used and easy to assemble, having a wind tunnel function for cooling and heating of the batteries.

A typical embodiment of the present invention will be described in the following with reference to the drawings.

Figure 2:
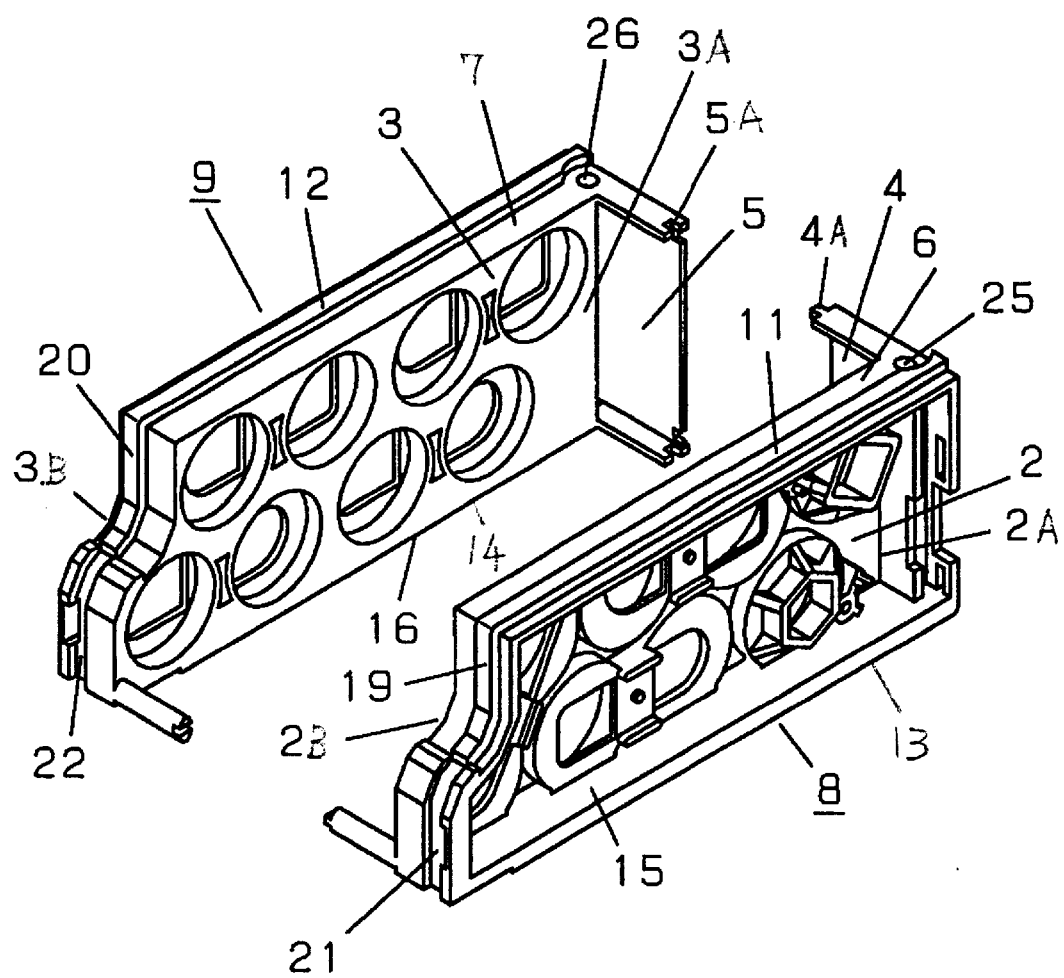
FIG. 2 is a perspective diagram of a casing used for a battery holding device embodying the present invention.
Figure 3:
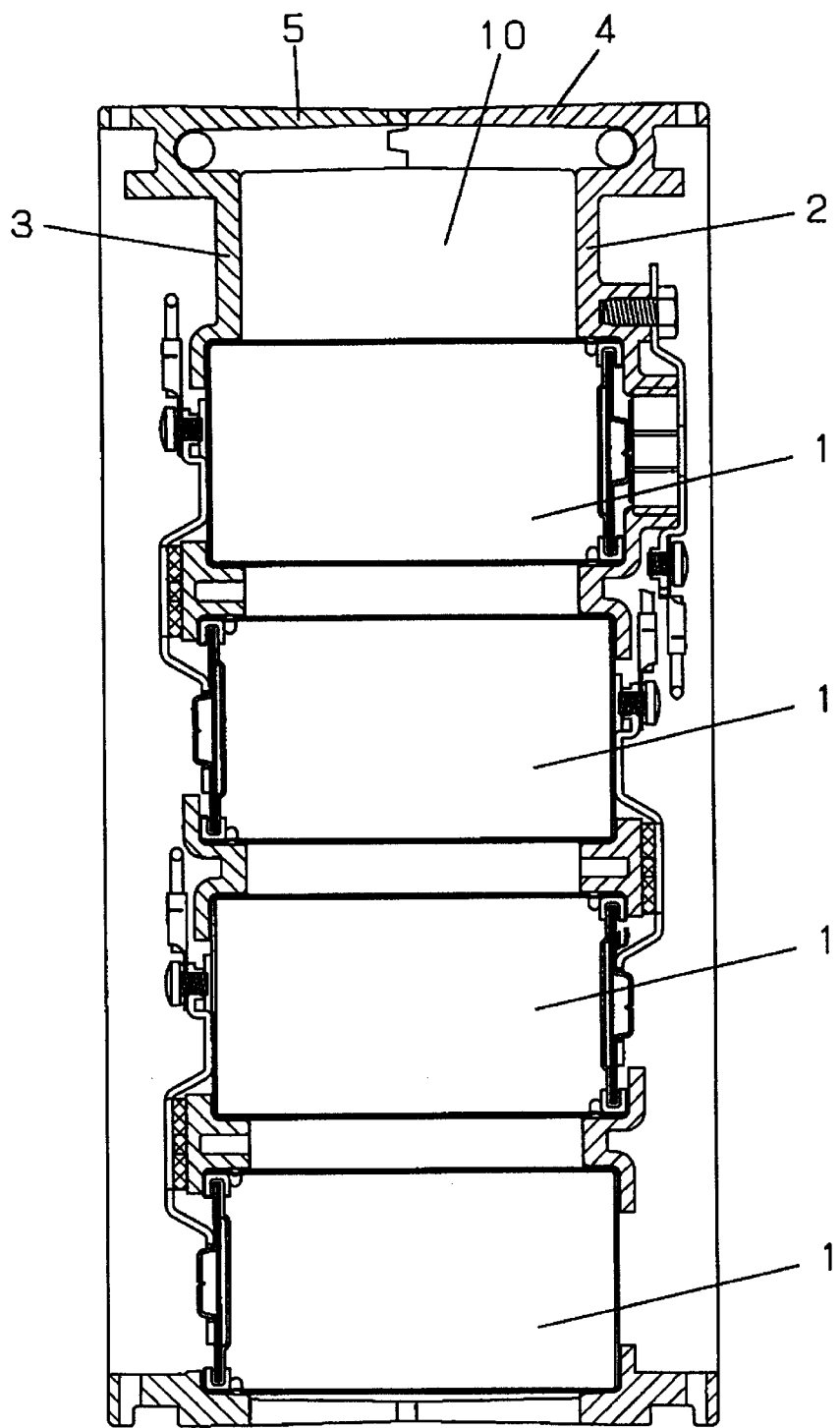
FIG. 3 is a sectional view of a module for a battery holding device embodying the present invention.

FIG. 1 is a perspective diagram of the appearance of a module 101 of a battery holding device of the embodiment. FIG. 2 is an exploded perspective view of casings which are the basic component parts of a module. FIG. 3 is a sectional diagram of the module. Here, a module stands for a casing provided with accessories such as a cover.

In a battery holding device of the embodiment, a plurality of batteries in rows are sandwiched between a pair of plate type supports 2, 3. A pair of the plate type supports 2, 3 comprise a first support and a second support.

The pair of supports 2, 3 have rib-form projection 4, 5 attached to at least one of ends 2A and 3A, and the projections inwardly extend toward each other. The ends of the productions 4, 5 respectively have a bulge and recess 4A, 5A to be engaged with each other. The production 4, 5 is not always required to be located at the end of support 2, 3. However, a space may be effectively created when a projection is formed at the end of the support.

The pair of supports 2 and 3, opposed and connected to each other, may catch batteries and then the first sides 6 and 7 of the supports are C-shaped. As a result, a space 10 is created internally of casing 8, 9.

Figure 4:
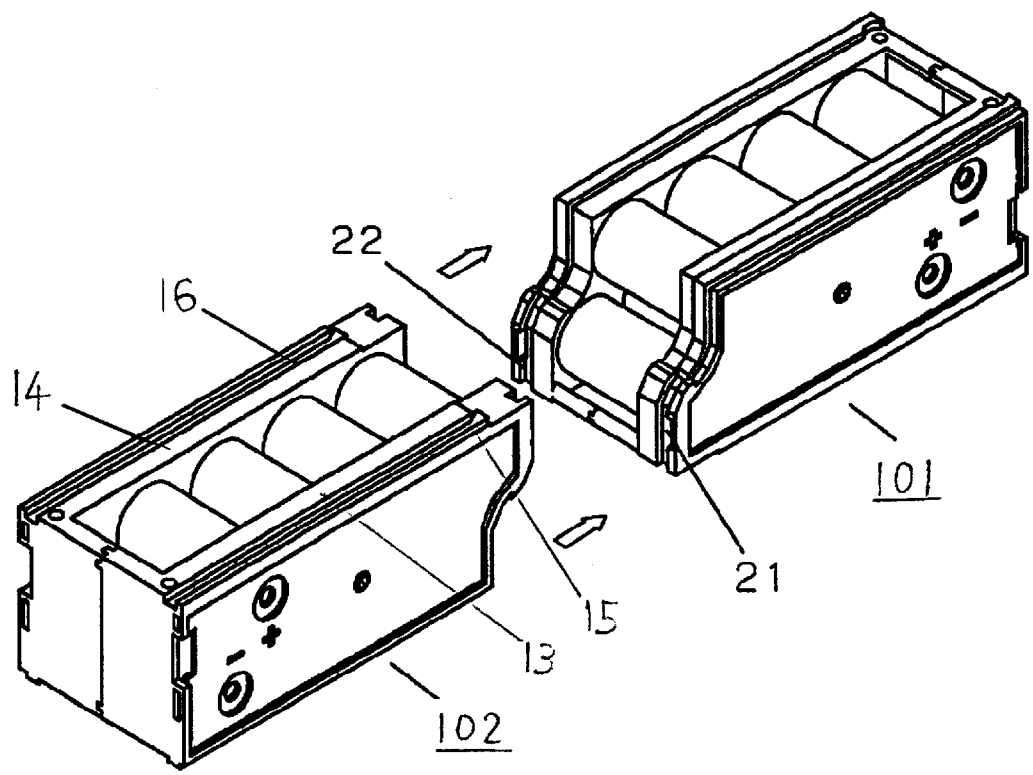
FIG. 4 is a perspective diagram showing a module connection for a battery holding device embodying the present invention.
Figure 5:
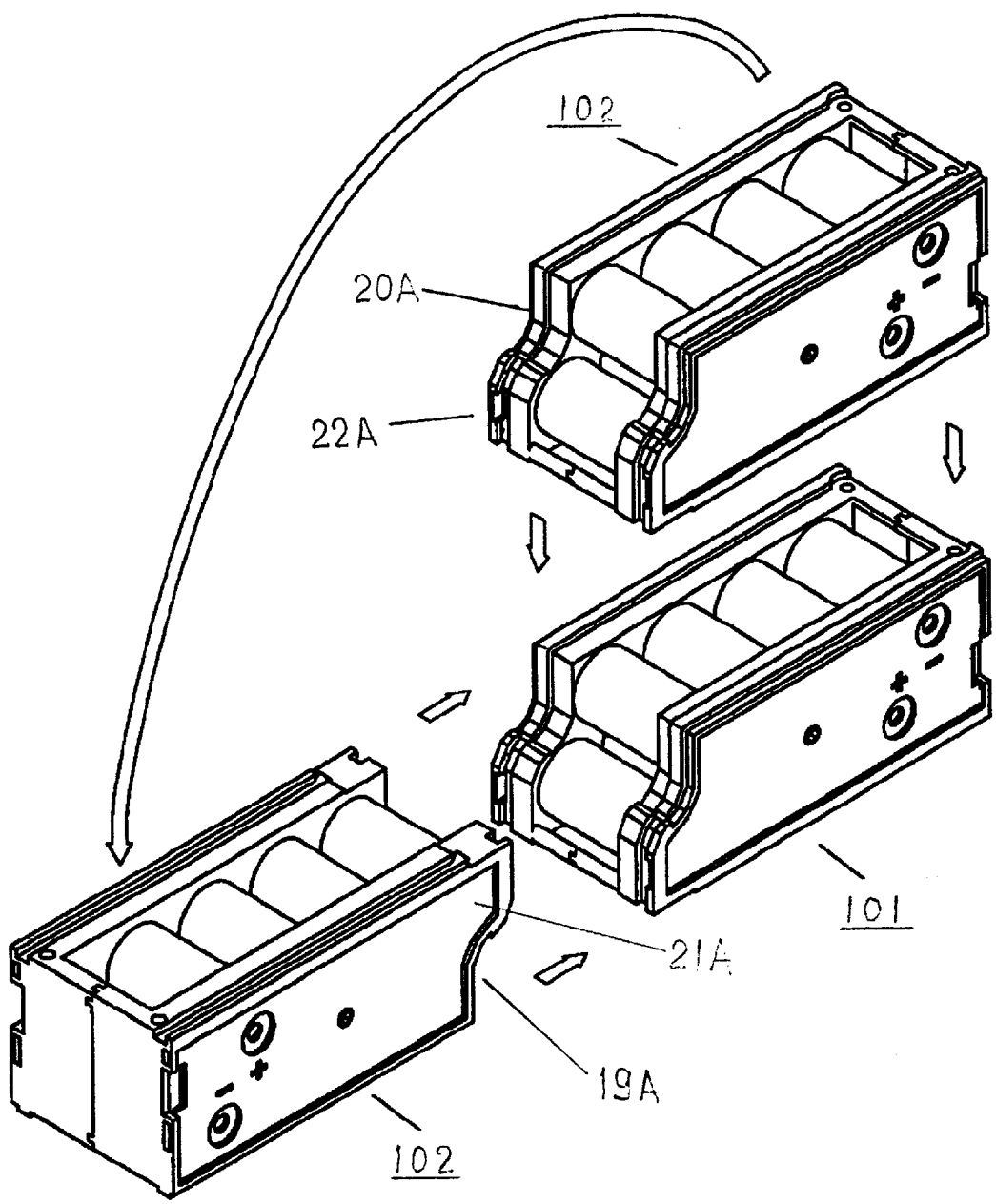
FIG. 5 is a perspective diagram showing a reversal of module connection for a battery holding device.

FIG. 4 is a perspective diagram showing a connection of two modules of FIG. 1, and FIG. 5 is a perspective diagram showing a reversal of the module connection.

In a casing consisting of a pair of supports 2, 3 and projections 4, 5 shown in FIG. 1, 2 and 3, the first side 6, 7 and the second side 13, 14 are formed into C shape and, as shown in FIG. 4 and 5, with a module 102 reversed, two modules 101 and 102 are connected to each other in opposed positions. Thus, a space or wind tunnel is created.

Casing 8, 9 has the convex 11, 12 formed at the first side 6, 7, and also recess 15, 16 formed at the second side 13, 14. These projections and recesses are engaged with each other for stacking purpose. In this way, the casings are reliably combined and connected with each other.

In this embodiment, at least 4 of a plurality of batteries 1 are arranged in two rows.

Further, the batteries arranged in the first row 17 and those arranged in the second row 18 are placed in a space. The batteries in the second row 18 are shifted by a half pitch in relation to the batteries in the first row 17. That is, these batteries are arranged just as in a barrel stack.

Due to the construction, the battery holding device is lower in height than a conventional battery holding device wherein the batteries are arranged at equal pitches horizontally and vertically.

Also, since the batteries 1 are arranged in such a barrel stack style, the other end 2B, 3B of the above support 2, 3 has a stepped portion as a stepped end. The stepped portion has a stepped shape. As shown in FIG. 5, the stepped end of the stepped shape has a recess 19A, 20A and a stepped end convex 21A, 22A to be engaged therewith. The upper half abutment of the stepped end has a small projection 19, 20, and the lower half abutment has a small recess 21, 22. The opposite to these relations is also true. That is, it is also preferable that a small recess is formed at the upper half and a small projection is formed at the lower half of the stepped end.

The parts are assembled in a manner such that the small projection 19, 20 and small recess 21, 22 are engaged with each other with the top and bottom reversed in relation to the other end 2B, 3B. The recess 19A, 20A of the stepped end is similarly engaged with the stepped end convex 21A, 22A. FIG. 4 is a state of engagement between two modules.

That is, the first support includes the first projection and a first stepped portion formed at the another end of said first support, the second support includes the second projection and a second stepped portion formed at the another end of the second support, the casing includes a first casing and a second casing, each casing of the first casing and the second casing has the projections and the stepped portions, the stepped portions are connected to each other, and thereby a space surrounded by the first casing and the second casing is formed. The casing has the space so that the plurality of batteries may be arranged in a plurality of rows, and may be shifted by a half pitch every row, and when the plurality of batteries are set in said casing, a wind tunnel for ventilation is formed between said each battery. Each stepped portion of the first stepped portion and the second stepped portion has a step shape of even steps, the plurality of batteries may be arranged in a plurality of even rows, and may be shifted by a half pitch every row, a difference in the step shape has a distance according to the half pitch every row, and when the first casing and the second casing are connected each other, and when the plurality of batteries are set in said space, a distance between the battery placed at the stepped portion of. the first casing and the battery placed at the stepped portion of the second casing has same distance as the pitch of batteries setting in the first casing and the second casing. The first casing and the second casing have the same shape each other, and the first casing and the second casing are connected at said stepped portions in a state of reversed shape in positions. The each stepped portion has a first step and a second step, each end of said first step and second step has a small-convex and small-recess, the small-convex and small-recess of the first casing is connected to the small-convex and small-recess of the second casing.

Due to this construction, the casings are reliably connected to each other. Further, as two casings identical in shape are combined with each other, a wind tunnel for ventilation is formed therein and it is unnecessary to make many casings having different shapes. Accordingly, it is possible to reduce the number of parts used.

Also, this module is able to hold and store a number of batteries on a module basis. Further, the battery holding device may be set up in a multiple module style by assembling these modules.

Figure 6:
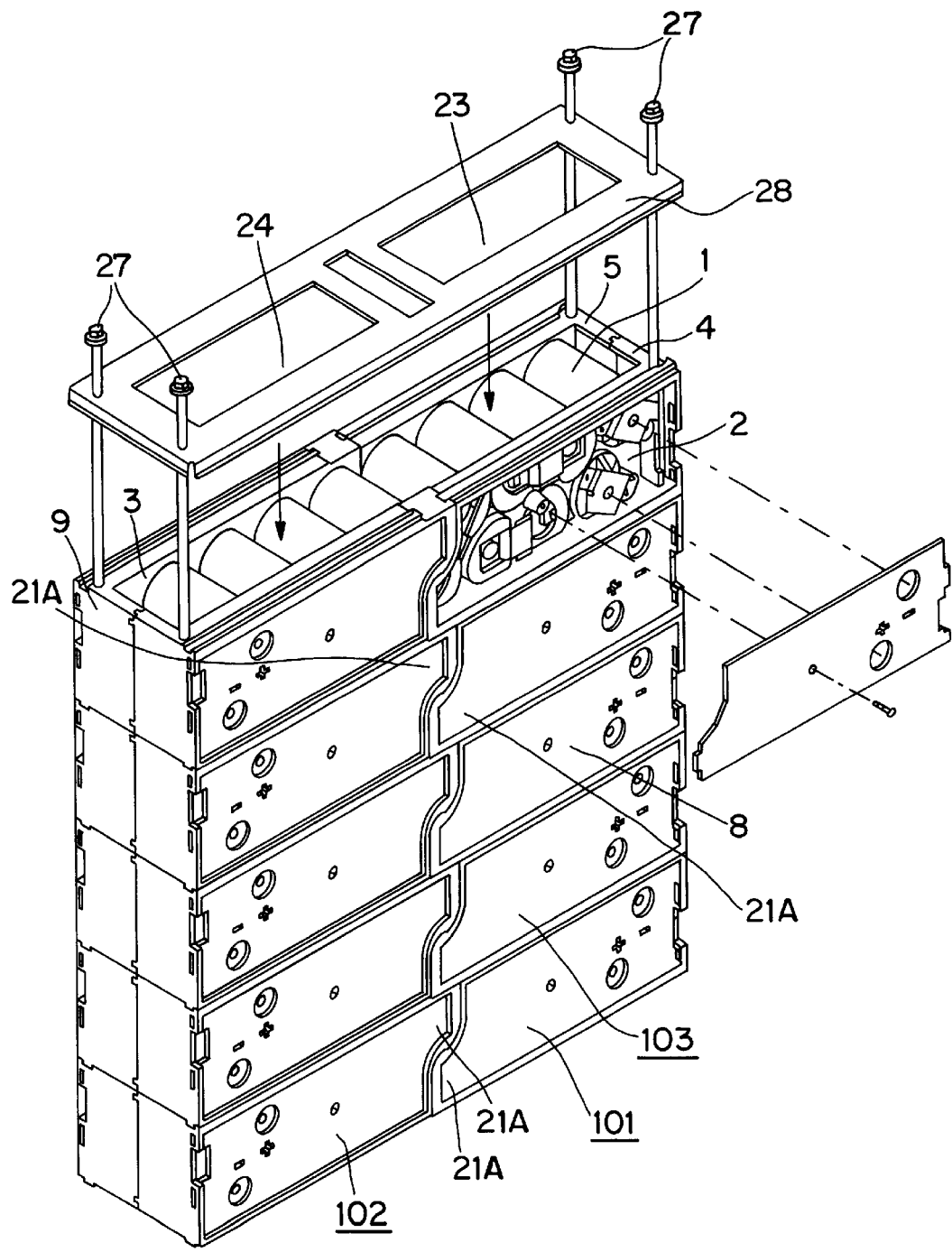
FIG. 6 is an exploded perspective view of a module assembly in 2-row 5-stage construction in a battery holding device embodying the present invention.
Figure 7:
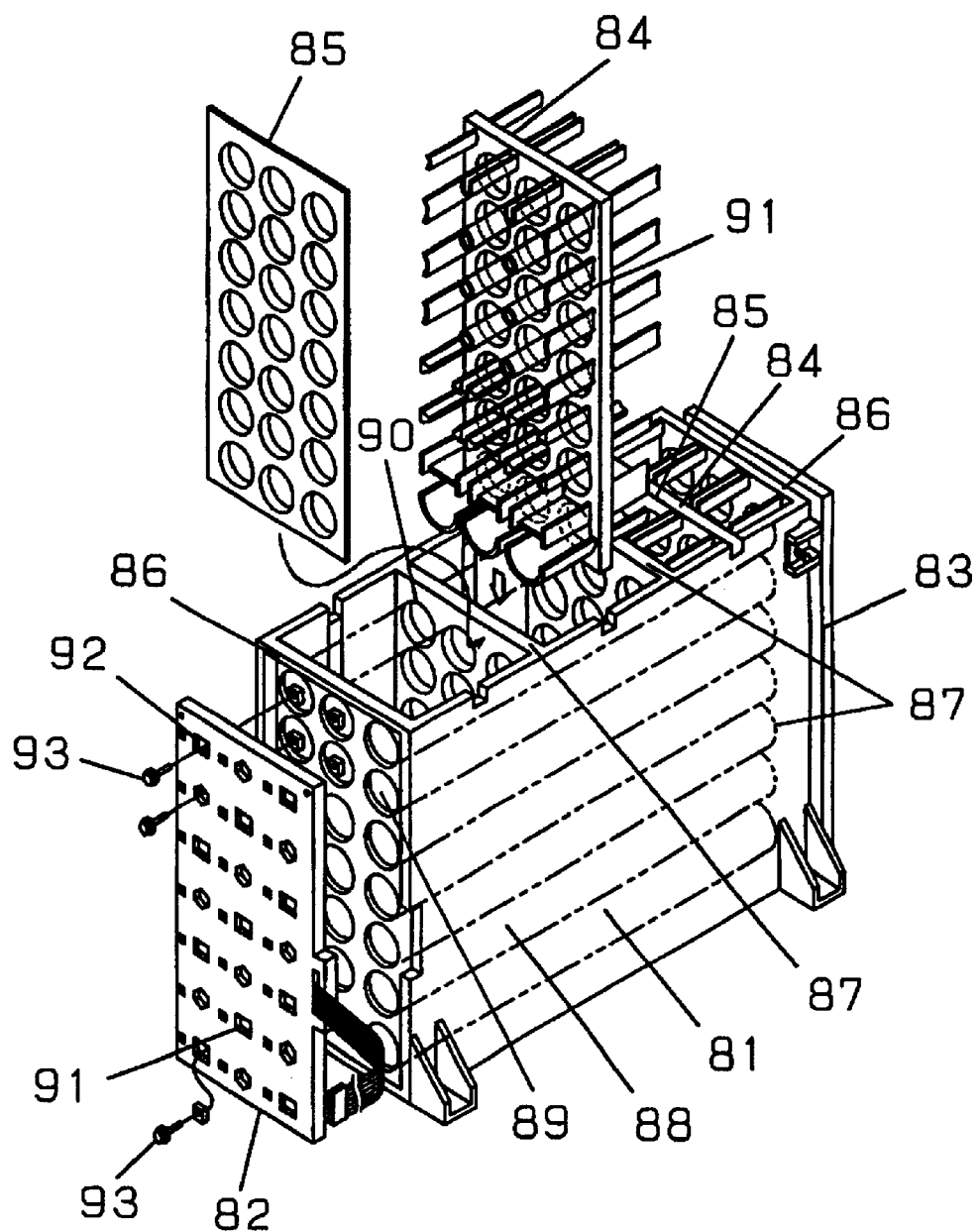
FIG. 7 is an exploded perspective view of a conventional battery holding device.

FIG. 6 is an exploded perspective view of a module assembly comprising the above-mentioned casings arranged in 2-row 5-stage construction. That is, the casing includes a plurality of casings, each casing of the plurality of casings has a first side, a second side, a first end and a second end, the first side has a convex, the second side has a recess, the first end has the protrusion, the second end has a stepped portion, the plurality of casings are respectively stacked one upon another so that the each convex and the each recess of the each casing is respectively engaged with adjacent, the plurality of casings are respectively connected one another on its side so that the stepped portions of the each casing is respectively engaged with adjacent, a space formed internally of each casing, and a space surrounded by the plurality of casings is formed, and the space has a ventilating passage in the form of a wind tunnel that is formed by providing a communication through the spaces. The casing has the space so that the plurality of batteries may be arranged in a plurality of rows, and may be shifted by a half pitch every row, the plurality of casings are connected, and when the plurality of battery are set in the casing, a wind tunnel for ventilation is formed between the each battery.

As shown in FIG. 6, when a plurality of modules 101, 102, 103 . . . are combined, the advantages will be as follows:

(1) The modules are arranged with the convex at the first side of the above casing engaged with the recess at the second side of the other casing. Accordingly, assembling and positioning of the parts are very easy.

(2) The modules create a ventilating passage in the form of a wind tunnel since space 23, 24 is formed inside the casing whose sides are connected to each other. Accordingly, the ventilating passage may be utilized as a passage for cooling and heating of the batteries.

(3) The modules are arranged with the stepped end convex 21A, 22A of the stepped ends alternately positioned so that the casings may be reliably and securely engaged with each other.

When a plurality of modules are combined, there are provided bolt holes 25, 26 at the corners of the casings 8, 9 in order to secure the entire construction.

The hole goes through from the first side 6, 7 to the second side 13, 14.

Bolt 27 is inserted into the bolt hole 25, 26. A plurality of adjacent casings may be easily and rigidly secured by tightening the through bolt 27.

In that case, a fixing plate 28 is fitted in place to prevent loosening of individual modules.

Due to this construction, the battery holding device is structurally simplified. Also, it is possible to maintain and improve the cooling and heating performance for the batteries. Further, the battery holding device may be manufactured at a low cost, the man-hour for assembling a battery holding device will be reduced, and it becomes easier to assemble the parts of the battery holding device.

Incidentally, it is also possible for the other ends 2B, 3B of supports 2, 3 to have rib-form projections extending inwardly of each other, which is not shown.

The shape formed by the first side 6, 7 and the second side of a pair of the supports 2, 3 is square. In this case, space 10 created inside the casing 8, 9 is a wind tunnel formed by only one module comprising a pair of casings.

In such construction, it is possible to achieve the operational advantages as described above.

Also, as for stepped parts as shown in the embodiment, besides the projections and recesses as shown, it also means that the parts are staggered or zigzag-formed so as to be smoothly engaged with each other. And any suitable number of steps may be used.

Further, all the ends 2B, 3B shown in this embodiment are stepped. However, these are not always required to be stepped. Also usable are ends 2B, 3B which are linear in shape and having projections at the upper half of the abutment and recesses at the lower half of the abutment. In this construction, a module may be reversed to be combined into one body with another, thereby bringing about same advantages as mentioned above.

What is claimed is:

1. A battery holding device comprising:

a first plate to support and a second plate type support, wherein at least one of said supports includes a projection;

wherein said at least one projection connects said first support and said second support parallel to one another, said first support and said second support form a casing, and said casing holds a plurality of batteries arranged in rows, and wherein said casing has a first side and a second side, said first side has convex, and said second side has a recess.

2. The battery holding device of claim 1, wherein said first support includes a first projection and said second support includes a second projection, said first projection and said second projection are connected to each other, and said first support, said second support, said first projection and said second projection form said casing.

3. The battery holding device of claim 2, wherein said projections are plates.

4. The battery holding device of claim 2, wherein said plurality of batteries are arranged in a plurality of rows, and are shifted by a half pitch every row, and a wind tunnel is formed between each of said plurality of batteries.

5. A battery holding device comprising:

a first plate type support and a second plate type support, wherein at least one of said supports includes a projection;

wherein said at least one projection connects said first support and said second support parallel to one another, said first support and said second support form a casing, and said first support includes a first projection and said second support includes a second projection, said first projection and said second projection are connected to each other, and said first support, said second support, said first projection and said second projection form said casing, said casing holds a plurality of batteries arranged in rows, and wherein said casing includes a plurality of casings, each casing of said plurality of casings has a first side and a second side, said first side has a convex, said second side has a recess, said plurality of casings are respectively stacked one upon another, said each convex of said each casing is respectively engaged with said each recess of adjacent each casing, said each of said casings has a space formed internally of each casing, and said each casing has a ventilating passage in the form of a wind tunnel that is formed by providing a communication through said spaces.

6. The battery holding device of claim 5, wherein each said casing includes said space so that said plurality of batteries are arranged in a plurality of rows, and are shifted by a half pitch every row, and a wind tunnel is formed between each of said plurality of batteries.

7. A battery holding device comprising:
   a first plate type support and a second plate type support, at least one of said supports includes a projection; and
   a bolt
   wherein said at least one projection connects said first support and said second support parallel to one another,
   said first support and said second support form a casing, and said first support includes a first projection and said second support includes a second projection, said first projection and said second projection are connected to each other, and said first support, said second support, said first projection and said second projection form said casing,
   said casing holds a plurality of batteries arranged in rows, and
   said casing includes a plurality of casings, each casing of said plurality of casings ha a first side and a second side, said each casing includes holes for casing connection and bolts for casing connection, said hole goes through from said first side to said second, said bolt is inserted into said hole, and said plurality of casings are respectively secured in one body by said bolts.

8. The battery holding device of claim 7, wherein each casing includes a plurality of corners, wherein said holes are respectively formed at said plurality of corners.

9. A battery holding device comprising:
   a first plate type support and a second plate type support, wherein at least one of said supports includes a projection;
   wherein said at least one projection connects said first support and said second support parallel to one another,
   said first support and said second support form a casing, and said casing holds a plurality of batteries arranged in rows, wherein said casing has a first side and a second side, said first side has a convex, and said second side bas a recess;
   said casing is one a plurality of casings, said plurality of casings including a first casing and a second casing, wherein said first support of each casing includes a first projection and a first stepped portion at an end of said first support opposite of said first projection,
   said second support of each casing includes a second projection and a second stepped portion at an end of said second support opposite of said second projection,
   said first projection and said second projection are connected to each other, and
   said first stepped portion and said second stepped portions are connected to each other, and thereby a space surrounded by said first casing and said second casing is formed.

10. The battery holding device of claim 9, wherein each said casing has said space in which said plurality of batteries are arranged in a plurality of rows, and are shifted by a half pitch every row, and
   a wind tunnel is formed between each of said plurality of batteries.

11. A battery holding device comprising:
   a first plate type support and a second plate type support, wherein at least one of said supports includes a projection;
   wherein said at least one projection connects said first support and said second support parallel to one another,
   said first support and said second support form a casing, and
   said casing holds a plurality of batteries arranged in rows,
   said casing is one a plurality of casings, said plurality of casings including a first casing and a second casing, wherein said first support of each casing includes a first projection and a first stepped portion at an end of said first support opposite of said first projection,
   said second support of each casing includes a second projection and a second stepped portion at an end of said second support opposite of said second projection,
   said first projection and said second projection are connected to each other,
   said first stepped portion and said second stepped portions are connected to each other, and thereby a space surrounded by said first casing and said second casing is formed;
   each said casing has said space in which said plurality of batteries are arranged in a plurality of rows, and are shifted by a half pitch every row, and a wind tunnel is formed between each of said plurality of batteries, and
   each stepped portion of said first stepped portion and said second stepped portion has a step shape of even steps, said plurality of batteries may be arranged in a plurality of even rows, and may be shifted by a half pitch every row, a difference in the step shape has a distance according to the half pitch every row, and when said first casing and said second casing are connected each other, and when said plurality of batteries are set in said space, a distance between the battery placed at said stepped portion of said first casing and the battery placed at said stepped portion of said second casing has same distance as the pitch of batteries setting in said first casing and said second casing.

12. The battery holding device of claim 11, wherein said first stepped portion and said second stepped portion each includes two steps, such that said plurality of batteries may be arranged in two rows.

13. The battery holding device of claim 11, wherein said first casing and said second casing have the same shape, and
   said first casing and said second casing are connected at said stepped portions, wherein one of said first casing and said second casing is inverted with respect to the other.

14. The battery holding device of claim 13, wherein said each stepped portion has a first step and a second step,
   each end of said first step and said second step has a small-convex and a small-recess, and
   said small-convex and small-recess of said first casing are connected to said small-convex and small-recess of said second casing.

15. A battery holding device comprising:
   a first plate type support and a second plate type support, wherein at least one of said supports includes a projection,
   wherein said at least one projection connects said first support and said second support parallel to one another,
   said first support and said second support form a casing, and said first support includes a first projection and said second support includes a second projection, said first projection and said second projection are connected to each other, and said first support, said second support, said first projection said second projection form said casing,
   said casing holds a plurality of batteries arranged in rows, and
   said casing includes a plurality of casings, each casing of said plurality of casings has a first side, a second side, a first end and a second end, said first side has a convex, said second side has a recess, said first end has said protrusion, said second end has a stepped portion, said plurality of casings are respectively stacked one upon another so that said ah convex and said each recess of said each casing is respectively engaged with adjacent, said plurality of casings are respectively connected one another on its side so that said stepped portions of said each casing is respectively engaged with adjacent, space formed internally of each casing, and a space surrounded by said plurality of casings is formed, and said space has a ventilating passage in the form of a wind tunnel that is formed by providing a communication through said spaces.

16. The battery holding device of claim 15, wherein each said casing has said first space in which said plurality of batteries are arranged in a plurality of rows, and are shifted by a half pitch every row, and a wind tunnel for ventilation is formed between each of said plurality of batteries.

17. The battery holding device of claim 16, further comprising a plurality of bolts and a fixing plate, wherein said fixing plate is disposed at the top of said casings, said each casing includes holes for connecting said plurality of casings, said holes extend from said first side to said second side, said bolts are inserted into said holes, and said plurality of casings and said fixing plate are secured together by said bolts.

18. A battery holding device for holding a plurality of cylindrical batteries comprising:

a first plate type support and a second plate type support, at least one of said supports includes a plate type projection;

wherein said at least one plate type projection connects said first support and said second support parallel to one another, said first support, said second support and said plate type projection form a casing, said casing has a space formed by each inner surface of said first support, said second support and said plate type projection, said casing has a first opening formed and a second opening which are opposite to each other, said casing holds said plurality of cylindrical batteries arranged in rows, so that said first support and said second support hold each end of said plurality of cylindrical batteries, and a wind tunnel is formed between each of said plurality of cylindrical batteries so that a wind flows from said first opening to said second opening.

19. The battery holding device of claim 18, wherein said first support includes a first plate type projection and said second support includes a second plate type projection, said first plate type projection and said second plate type projection are connected to each other; and said first support, said second support, said first plate type projection and said second plate type projection form said casing.

20. The battery holding device of claim 19, wherein said plate type projection has an inner wall without an opening.

21. The battery holding device of claim 19, wherein said plurality of batteries are arranged in a plurality of rows, and are shifted by a half pitch every row and a wind tunnel is formed between each of said plurality of batteries.

22. The battery holding device of claim 19, wherein said casing has a U-shaped side wall formed from said first support, said second support and said plate type projection.

23. The battery holding device of claim 19, wherein said casing has a first side and a second side, said first side has a convex, and said second side has a recess.

24. The battery holding device of claim 19, wherein said first projection has a bulge formed at the end of said first projection, said second projection has a recess formed at the end of said second projection, and said bulge and said recess are engaged with each other.

25. The battery holding device of claim 19, wherein said casing is one of a plurality of casings, said plurality of casings including a first casing and a second casing, said first support of each casing includes a first projection and a first stepped portion at an end of said first support opposite said first projection, and said second support of each casing includes a second projection and a second stepped portion at an end of said second support opposite said second projection, said first projection and said second projection are connected to each other, said first stepped portion and said second stepped portion are connected to each other, to form a further space surrounded by said first casing and said second casing.

26. The battery holding device of claim 25, wherein each of said first stepped portion and said second stepped portion have a step shape including a plurality of steps, said step shape is sized according to the half pitch every row arrangement of said plurality of cylindrical batteries, and said first projection and said second projection are connected to each other.

27. The battery holding device of claim 26, wherein said plurality of casings further includes a third casing and a fourth casing, said third casing and said fourth casing are stacked on said first casing and second casing which are connected with each other, and said casings have a ventilating passage, in the form of said wind tunnel formed through said space.

* * * * *

UNITED STATES PATENT AND TRADEMARK OFFICE
CERTIFICATE OF CORRECTION

PATENT NO. : 6,400,122 B1
DATED : June 4, 2002
INVENTOR(S) : Akira Iwamura

It is certified that error appears in the above-identified patent and that said Letters Patent is hereby corrected as shown below:

Column 8,
Line 18, insert -- a -- before "convex."

Column 9,
Line 36, delete "bas" and insert -- has --.

Column 11,
Line 5, delete "ah" and insert -- each --.

Signed and Sealed this

Fourth Day of March, 2003

JAMES E. ROGAN
*Director of the United States Patent and Trademark Office*